(12) United States Patent
Kleinerman et al.

(10) Patent No.: US 11,687,436 B2
(45) Date of Patent: *Jun. 27, 2023

(54) AUTO INSIGHTS INTO DATA CHANGES

(71) Applicant: Snowflake Inc., Bozeman, MT (US)

(72) Inventors: Christian Kleinerman, Burlingame, CA (US); Christopher F. Pouliot, Portola Valley, CA (US); Jacobus J. P. Van Ryswyck, Danville, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,581

(22) Filed: Mar. 25, 2022

(65) Prior Publication Data

US 2023/0059980 A1    Feb. 23, 2023

Related U.S. Application Data

(63) Continuation of application No. 17/408,284, filed on Aug. 20, 2021, now Pat. No. 11,321,212.

(51) Int. Cl.
*G06F 11/34* (2006.01)
*G06F 11/30* (2006.01)

(52) U.S. Cl.
CPC ...... *G06F 11/3419* (2013.01); *G06F 11/3006* (2013.01); *G06F 11/3075* (2013.01); *G06F 11/3466* (2013.01)

(58) Field of Classification Search
CPC ............ G06F 11/3419; G06F 11/3006; G06F 11/3075; G06F 11/3466; G06F 16/2453

USPC ....................................................... 702/168
See application file for complete search history.

(56) References Cited

U.S. PATENT DOCUMENTS 10,635,667 B2    4/2020  Ding et al.
11,321,212 B1 *  5/2022  Kleinerman ........ G06F 11/3075

FOREIGN PATENT DOCUMENTS

CA    2564003 A1    4/2007

OTHER PUBLICATIONS

"U.S. Appl. No. 17/408,284, Non Final Office Action dated Nov. 3, 2021", 16 pgs.
"U.S. Appl. No. 17/408,284, Notice of Allowance dated Feb. 17, 2022", 9 pgs.
"U.S. Appl. No. 17/408,284, Response filed Feb. 3, 2022 to Non Final Office Action dated Nov. 3, 2021", 10 pgs.

* cited by examiner

*Primary Examiner* — John H Le
(74) *Attorney, Agent, or Firm* — Schwegman Lundberg & Woessner, P.A.

(57) ABSTRACT

Techniques described herein can monitor various data metrics. The auto-insight techniques can further detect and rank data segments that contributed to, or counteracted, shifts in data and detect when such shifts occurred. Thus, the techniques described herein can detect and identify root causes in shifts in different metrics. The techniques include pruning and ranking causes to identify the root causes and identify non-relevant factors, as well.

24 Claims, 12 Drawing Sheets

| Cloud | Deployment | Account | Industry | Country | Tier | Growth | Excess | Contrib |
|---|---|---|---|---|---|---|---|---|
| <all> | <all> | <all> | <all> | <all> | <all> | -0.4% | -2,341 | -100% |
| aws | va | <all> | <all> | <all> | Large | -6.1% | -1,833 | -78% |
| aws | va | <all> | <all> | <all> | <all> | -1.3% | -1,635 | -70% |
| <all> | <all> | <all> | Media, Entmt | <all> | <all> | -1.5% | -1,635 | -70% |
| <all> | <all> | Company A | Media, Entmt | <all> | Large | -5.6% | -1,612 | -69% |
| <all> | <all> | <all> | Media, Entmt | United States | Large | -13.7% | -1,295 | -55% |
| <all> | <all> | <all> | <all> | <all> | Large | -0.9% | -975 | -42% |
| aws | va | <all> | Media, Entmt | <all> | <all> | -2.9% | -946 | -40% |
| <all> | <all> | <all> | <all> | United States | <all> | -0.5% | -502 | -21% |
| aws | Prod1 | <all> | <all> | <all> | Medium | -0.8% | -478 | -20% |

FIG. 5

AUTO INSIGHTS INTO DATA CHANGES

CROSS-REFERENCE TO PRIORITY APPLICATION

This application is a continuation of U.S. patent application Ser. No. 17/408,284, filed Aug. 20, 2021, the contents of which are incorporated herein by reference in their entirety.

TECHNICAL FIELD

The present disclosure generally relates to business intelligence into changes in big data, in particular detecting root causes behind changes in data metrics.

BACKGROUND

A cloud data warehouse (also referred to as a "network-based data warehouse" or simply as a "data warehouse") is a network-based system used for data analysis and reporting that comprises a central repository of integrated data from one or more disparate sources. A cloud data warehouse can store current and historical data that can be used for creating analytical reports for an enterprise. To this end, data warehouses can provide business intelligence tools, tools to extract, transform, and load data into the repository, and tools to manage and retrieve metadata.

Oftentimes, a change in metric can occur and that change may not be noticeable because it is hidden under a large amount of data. Moreover, the causes of that change of data can be hard to discover because of the large amount of data and how the data is stored.

BRIEF DESCRIPTION OF THE DRAWINGS

Various ones of the appended drawings merely illustrate example embodiments of the present disclosure and should not be considered as limiting its scope.

FIG. 5 shows an output table, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques described herein can monitor various data metrics. The auto-insight techniques described herein can further detect and rank data segments that contributed to, or counteracted, shifts in data and detect when such shifts occurred. Thus, the techniques can detect and identify root causes in shifts in different metrics. The techniques include pruning and ranking, as described herein, to identify the root causes and identify non-relevant factors, as well. These techniques can correct quantification, ensuring valuable insights are not missed. These techniques can also detect shifts when such shifts are hidden behind other changes, e.g., when data shifts produce little or no change in overall net value possibly due to other shifts. These techniques also can handle composite business metrics that are ratios or probabilities.

Figure 1:
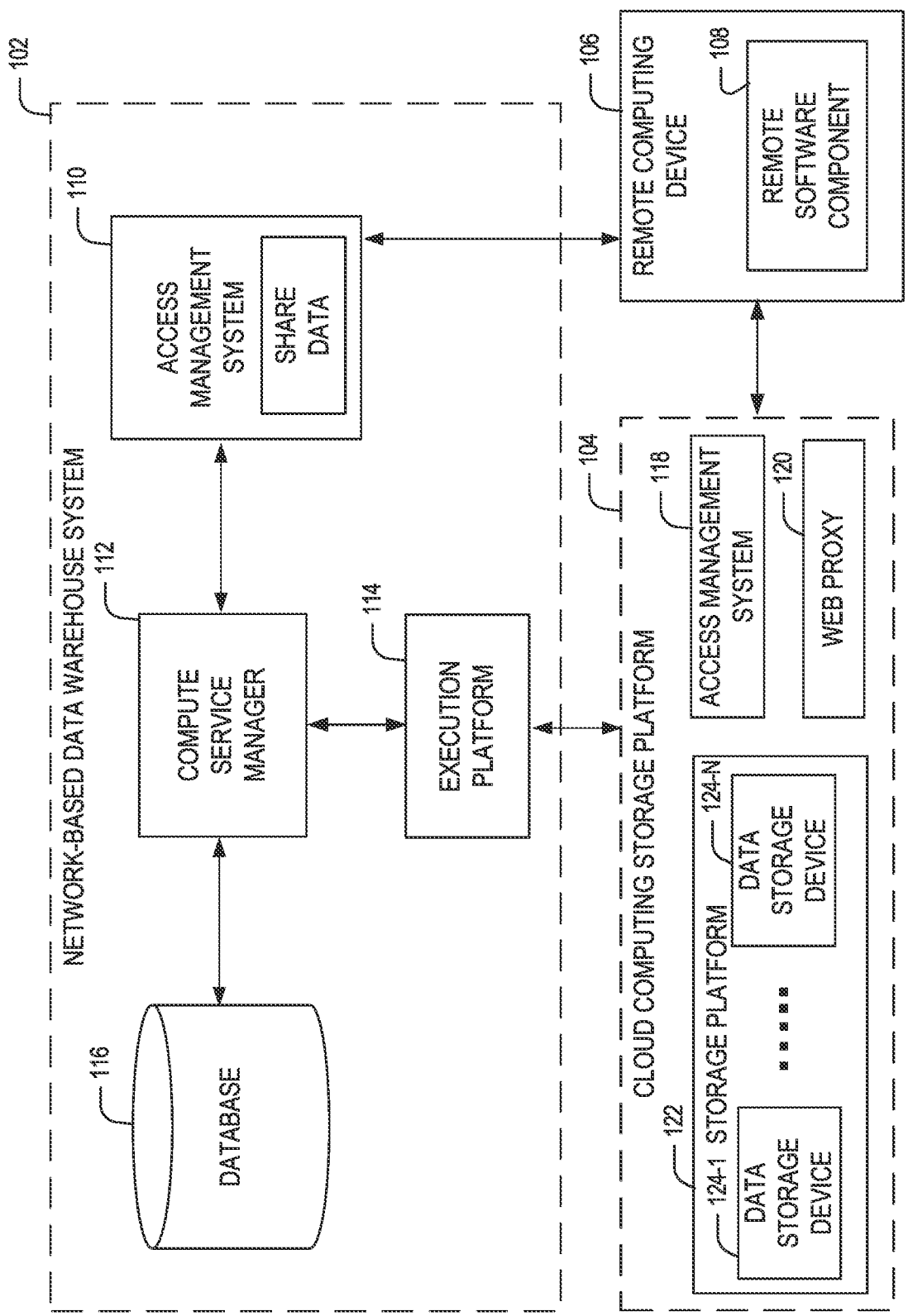
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer)

that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
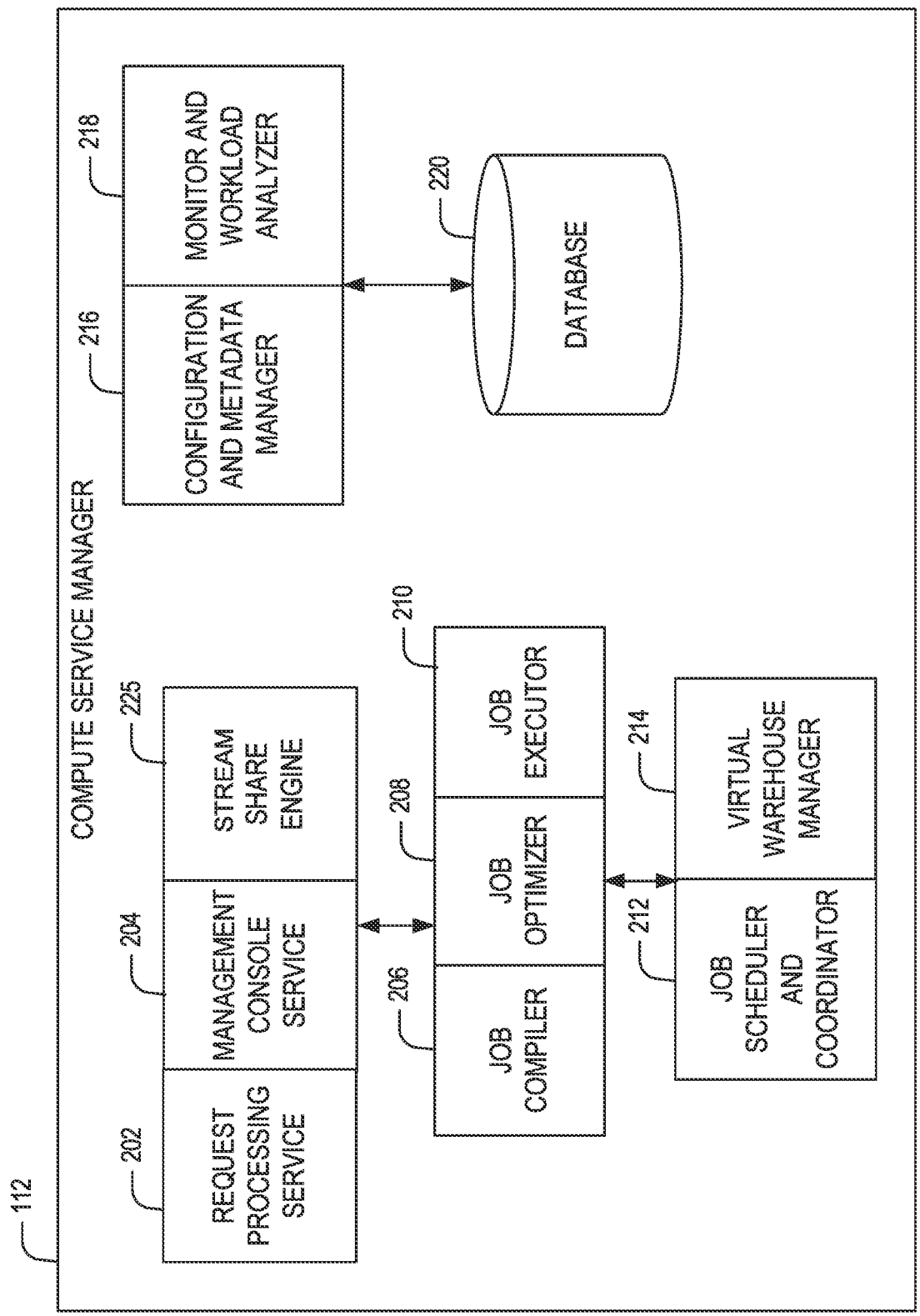
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
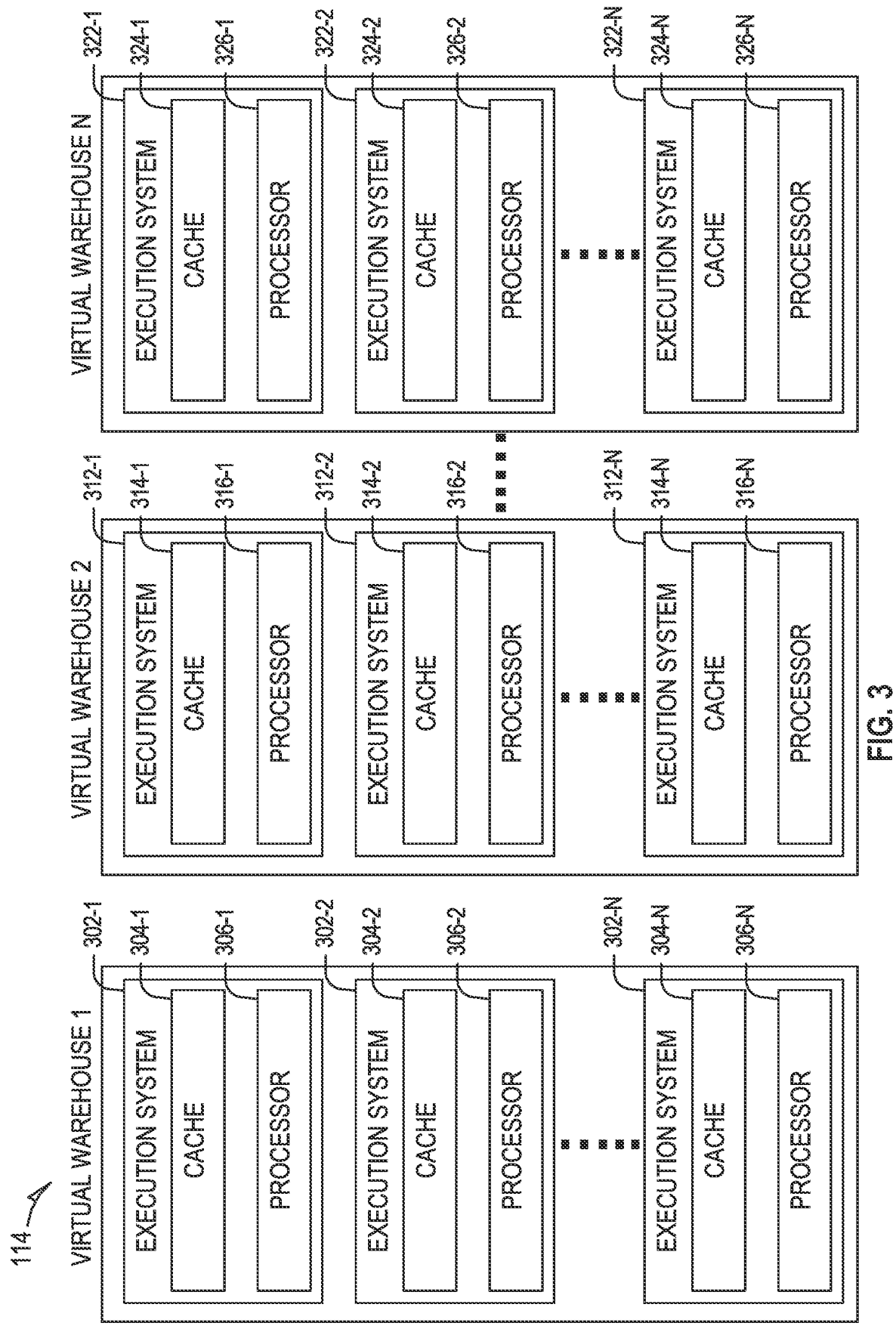
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Next, auto-insight techniques will be described. As described in further detail below, the auto-insight techniques may track shifts in data metrics and then may detect and identify root causes behind the shifts. This may include detecting hidden shifts as well as observable shifts. An output may include a listing of each data segment identified as a root cause behind a metric change and its relative contribution to that change in metric.

Figure 4:
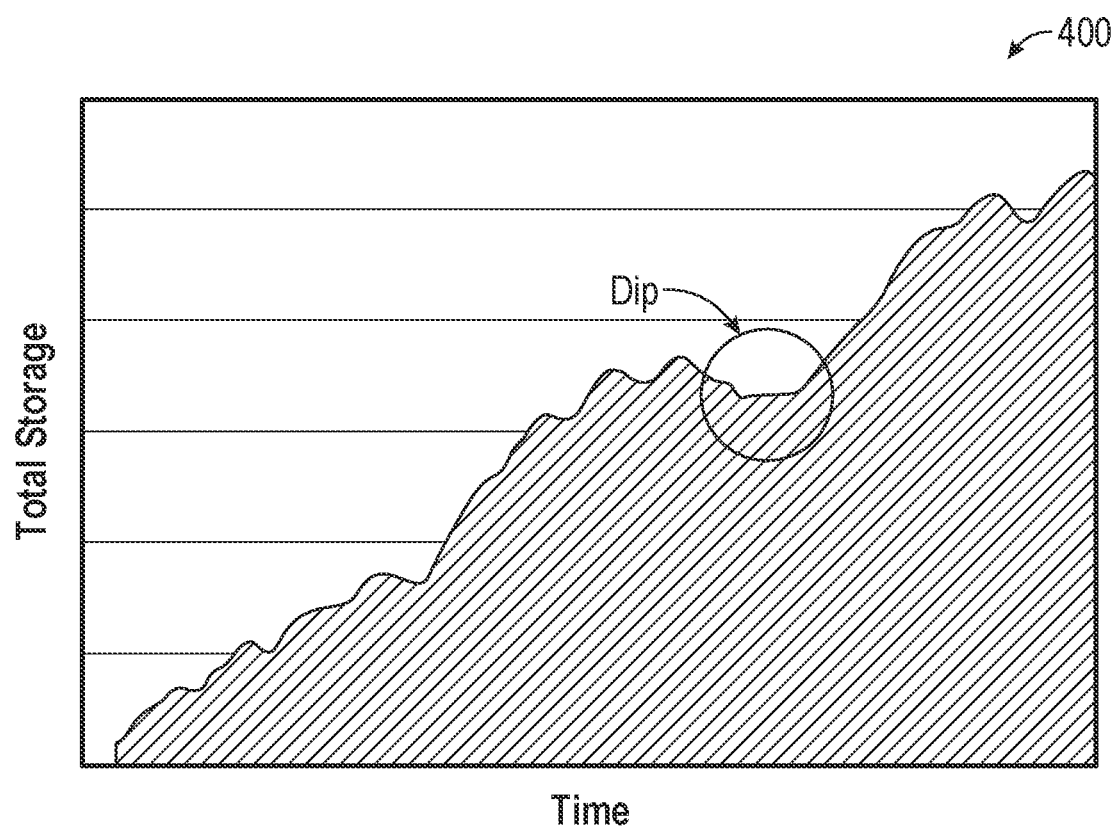
FIG. 4 shows a graph of total storage use for a data warehouse, according to some example embodiments.

FIG. 4 shows a graph 400 of total storage use for a data warehouse, according to some example embodiments. Graph 400 tracks the total amount of storage used over a period of time. As shown, the total storage being used generally increases over time, but there is an appreciable dip. The auto-insight techniques may be used to detect and identify the root causes of that dip.

To perform auto-insight, an input query may be generated. The input query may include three components: 1) dimensions, 2) treatment and control cohorts, and 3) KPI (Key Performance Indicator). The input query may group the dimensions and cohorts and then may aggregate the KPI. Dimensions may be categorical. Dimensions may correspond to the features by which the data is sliced. A data segment is defined by the combination of dimension values. In the example of FIG. 4, dimensions may correspond to the data features related to total amount of storage being used. A plurality of dimensions may be included in the input query.

Treatment and control cohorts may be binary indicators. The treatment cohort may be a group including the shift in data of interest (e.g., dip, spike, etc.). The control cohort may be a group that does not include the data shift, thus acting like a control group. In one example, the treatment and control cohorts are provided as time intervals. That is, the treatment cohort is a time interval including the data shift of interest, and the control cohort is a time interval without the data shift but with common features, such as being close in time, having similar factors, etc. The treatment and control cohort may be of different lengths.

The cohorts may also be provided as non-temporal data. For example, if the input query is targeted to determining "why is latency chronically higher in deployment A as compared to other deployments," the cohorts may be defined by deployments.

KPI may be a numerical metric. KPI is the business metric of interest. KPI may be a metric with certain defined properties. For example, KPI can be aggregated by addition, and KPI's values may be non-negative. If there are negative values, those values may be converted to non-negative values before execution of the input query. In the example of FIG. 4, the KPI may be the total amount of storage being used. The total amount of storage may be a pure aggregation or it may be an average. In some embodiments, the KPI admitting aggregation by addition and the values being non-negative may be required.

KPI may also include ratio and probability type KPIs. For ratio-type KPIs, consider the example of "pruning time per query." This may not be an additive metric. For example, if one group has an average of 3 ms per pruning time per query and another group has an average of 5 ms per pruning time per query, those numbers cannot be added together (i.e., the average across both groups is not 8 ms). Averages cannot be added for KPI. Instead, the numerator and denominator may be added separately, and the average ratio may then be determined.

For probability-type KPIs, consider the example of "activations from trial accounts." This is similar to a ratio-type KPI in that it has a separate numerator and denominator for aggregation. But since this KPI measures a probability, percentages cannot be arbitrarily scaled without losing relevant data. To enable proper scaling, the probability may be expressed in terms of odds. For the example of "activations from trial accounts," the numerator corresponds to the number of positives and the number denominator corresponds to the number of negatives, not the total. For example, if there were seven activations out of ten trials, the numerator is the seven positives, and the denominator is the 3 negatives. In the event there are zero negatives, a Bayesian inference (or other statistical inference) may be applied to dampen possible division by zero or small numbers.

The input query may be formed and generated. The results of the input query may be pruned and ranked, as described in further detail below. The output of the auto-insight technique may then be generated and may be provided as an output table.

The output table may include a plurality of rows corresponding to the data segments analyzed. The columns of the output table may include dimensional values. The dimensional values may include two types of special values. One special value (e.g., <any>) may signal that the data for that field was aggregated over all values in that dimension. The other special value (e.g., <unknown>) may signal that the original data for that field contained a null value in that dimension.

The columns may include observed KPI values in the treatment and control cohort. The columns may include a hierarchy depth, which may be defined as the number of dimensions by which the data was sliced (e.g., number of dimensions that are not <any>). The columns may include a Bayesian KPI in the treatment and control cohorts. This may include automatically generated Bayesian priors and may project the KPI numbers into a single value. For probability KPIs, the value may be positives divided by negatives (not total), representing the odds of the positives. For ratio KPIs, the value may be a numerator divided by a denominator, as described above. For other non-negative KPIs, the value may be the KPI itself.

The columns may also include: KPI grow, KPI excess, and contribution. KPI growth may represent the KPI growth of the treatment cohort as compared from the control cohort. This may be the ratio of Bayesian KPI in the treatment cohort divided by the same in the control cohort. KPI excess may be defined as the amount of observed KPI numerator in excess of the amount expected by looking at higher-level (lower hierarchical depth) data. KPI excess may allocate "credit" to each data segment. The contribution may be defined as the KPI excess normalized relative to the KPI excess in that data segment.

The input query may be executed, and the results may be pruned and ranked, as described in further detail below. The results may then be generated as an output table. FIG. 5 shows an output table 500, according to some example embodiments. The output table 500 may be generated using the auto-insight techniques described for the dip observed in graph 400 of FIG. 4. Each row may represent one data segment. The output table 500 may include a plurality of columns 502 defining the dimensions used for slicing the data. The special value <any> may indicate that the data in that segment was aggregated across all values in that dimension. For example, the top row contains <all> for all dimensions, indicating that it is the root segment, which is the segment containing the total aggregate of all data.

The output table 500 may include a growth column 504 indicating the percentage by which the metric spiked or dipped in that segment (e.g., the percentage of storage in this example). Since output table 500 is associated with a dip in the measured metric, all the segments show a negative growth. Here, it can be seen that the biggest percentage dip in this list came from Company A (−13.7%).

The output table 500 may also include an excess column 506 and contribution column 508. The excess column 506 may represent the metric recommended for ranking the segments. It reflects a notion of the "net contribution" to the change in metric value attributed to the segment. The contribution column 508 may include the excess value normalized by the value of the root segment. The excess and contribution values may be generated based on pruning and ranking.

Pruning and ranking may identify segments that contributed to an observed change in a KPI metric. Pruning may be performed on the result of the input query described above. Pruning may eliminate data segments that did not have a significant effect on the KPI. Pruning may be performed using different combination of dimensions in a hierarchy depth, as explained above.

Figure 6:
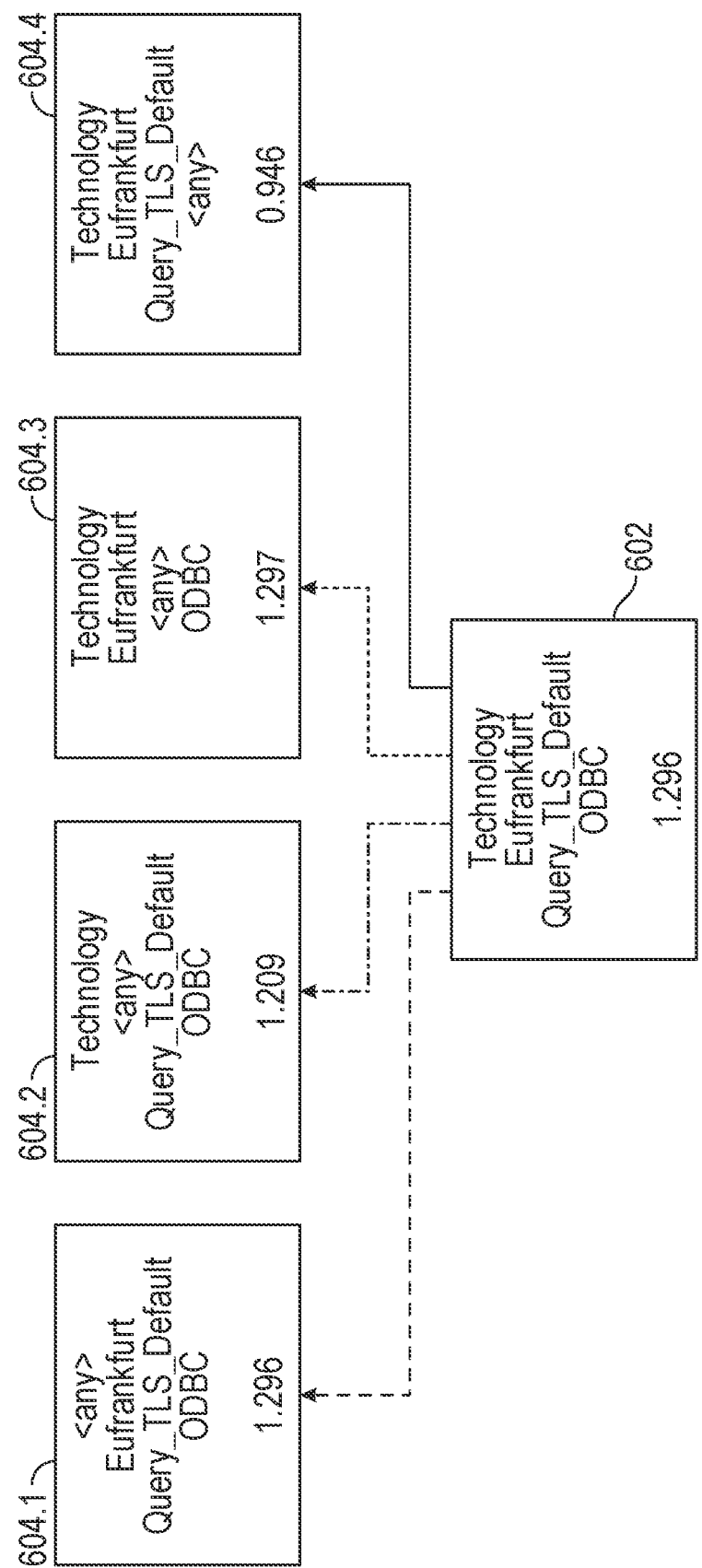
FIG. 6 shows a block diagram of pruning within two hierarchical levels, according to some example embodiments.

FIG. 6 illustrates a block diagram of pruning within two hierarchical levels, according to some example embodiments. Here, segment 602 shows the data segment with all four dimensions considered. In this example, the four dimensions are industry vertical=technology, deployment=eufrankfurt, cluster=QUERY_TLS_DEFAULT, and connector=ODBC. Segment 602 shows a KPI growth of 1.296. Segment 602 is at hierarchy depth four; therefore, segment 602 segment has four parent segments 604.1-604.4 A parent segment is obtained by aggregating the data along one more dimension, or, in other words, by removing one of the data slices. For example, segment 604.1 removes the industry vertical=technology dimension, replacing it with an aggregate over the industry verticals (<any>). Segment 604.1 shows a KPI growth of 1.296, the same KPI growth of segment 602.

Segment 604.2 removes the deployment=eufrankfurt dimension, replacing it with an aggregate over the deployment verticals (<any>). Segment 604.2 shows a KPI growth of 1.209.

Segment 604.3 removes the cluster=QUERY_TLS_DEFAULT, replacing it with an aggregate over the clusters verticals (<any>). Segment 604.3 shows a KPI growth of 1.297.

Segment 604.4 removes the connector=ODBC, replacing it with an aggregate over the connector verticals (<any>). Segment 604.4 shows a KPI growth of 0.946.

A growth in a data segment may be considered significant if it outgrows all its parent segments. Likewise, shrinking in a data segment may be considered significant if it shrinks more than all its parent segments. Hence, a data segment may be identified as significant if its KPI growth/shrink is outside the range of KPI growth of its parents.

In this example, data segment 602 may therefore not be considered significant because its parent segment 604.1 has the same KPI growth, and its parent segment 604.3 has a higher KPI growth. Thus, data segment 604 may be pruned out as not being a root cause of the metric being observed.

Figure 7:
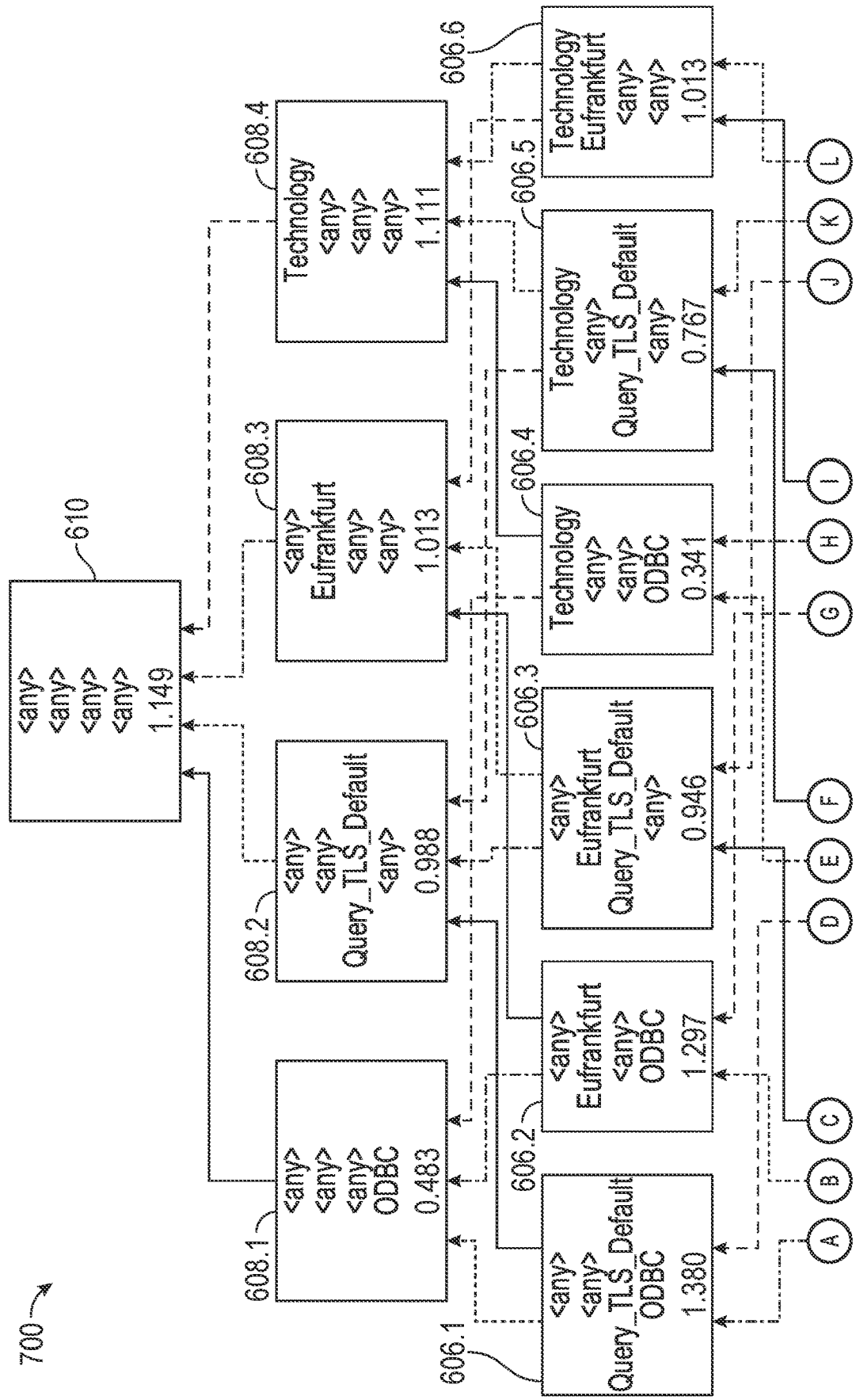
FIG. 7 shows a block diagram of pruning across a family tree of a data segment, according to some example embodiments.
Figure 7:
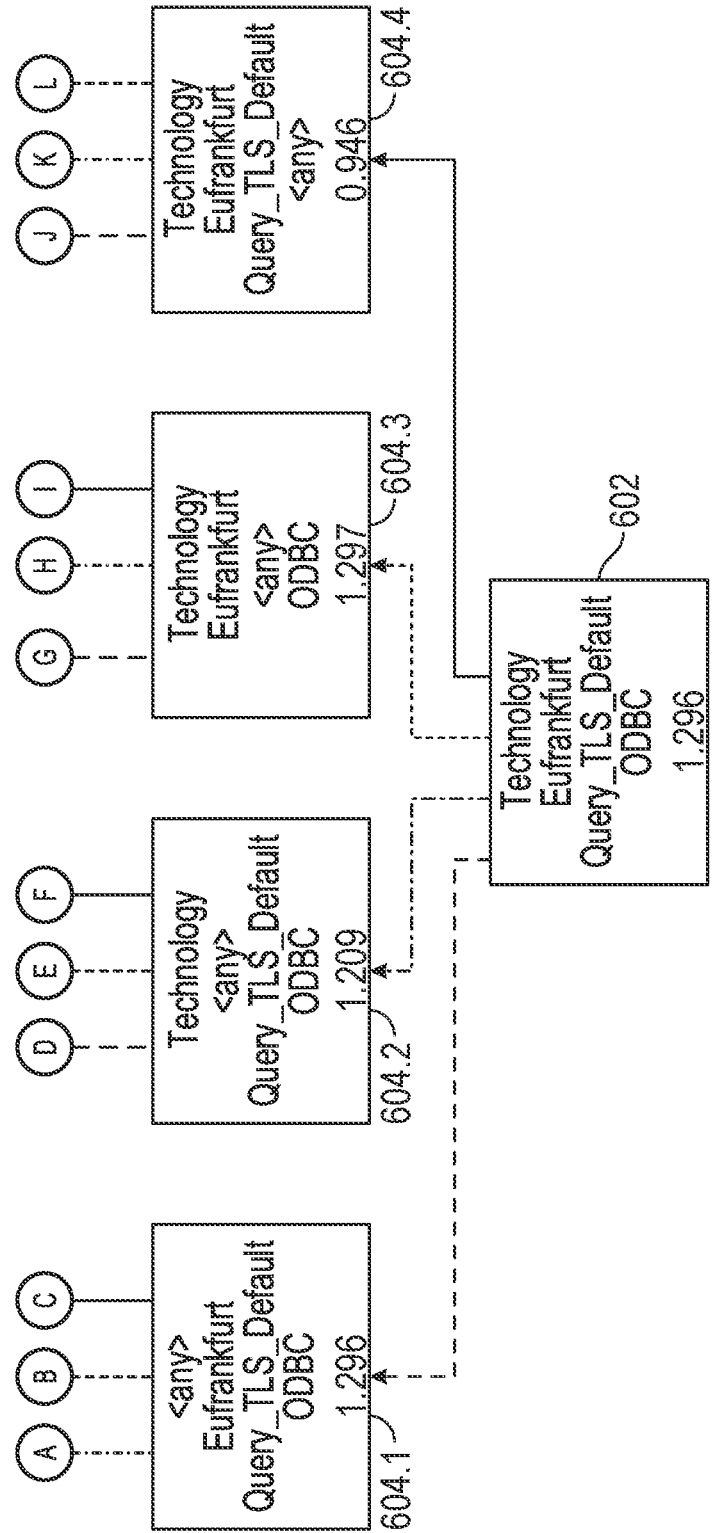

FIG. 7 shows a block diagram of pruning across a family tree 700 of a data segment, according to some example embodiments. Here, data segment is shown at hierarchy depth four with all four dimensions being considered with a KPI growth of 1.296. At the next hierarchy level (hierarchy depth three), four parent data segments 604.1-604.4, as discussed above, are shown where three dimensions are considered using different combinations. At the next hierarchy level (hierarchy depth two), the parent segments 606.1-606.6 of the segments 604.1-604.4 are shown. Segments 606.1-606.6 consider two dimensions using different combinations. Here, as shown, none of the data segments 604.1-604.4 have a higher KPI growth than its respective set of parent segments of segments 606.1-606.6.

At the next hierarchy level, (hierarchy depth one), the parent segments 608.1-608.4 of the segments 606.1-606.6 are shown. Segments 608.1-608.4 consider one dimension each, as shown. Here, segments 606.1 and 606.2 may be identified as significant segments because they have a larger KPI growth than any of their respective parent segments of segments 608.1-608.4. However, segment 606.1 may be eliminated from further consideration by filtering based on irrelevant features. Here, deployment and cluster dimensions roll up to into each other, so those segments associated with deployment and cluster, such as segment 606.1, may be filtered out as containing irrelevant information.

At the last hierarchy level (hierarchy depth zero), segment 610 is shown, which is considered the root segment since it has no parents. This segment 610 may also be identified as having a significant impact on the growth of the KPI (along with segment 606.2). Moreover, other segments whose KPI grew slower (or shrank faster) than their respective parents may also be identified, e.g., segments 606.3, 606.4, 608.1, 608.3, and 608.4. These segments are significant in that they counteract the KPI growth. The other segments may be pruned out as not having a significant impact on the KPI. In one example, pruning may eliminate approximately 96% of the data segments.

Figure 8:
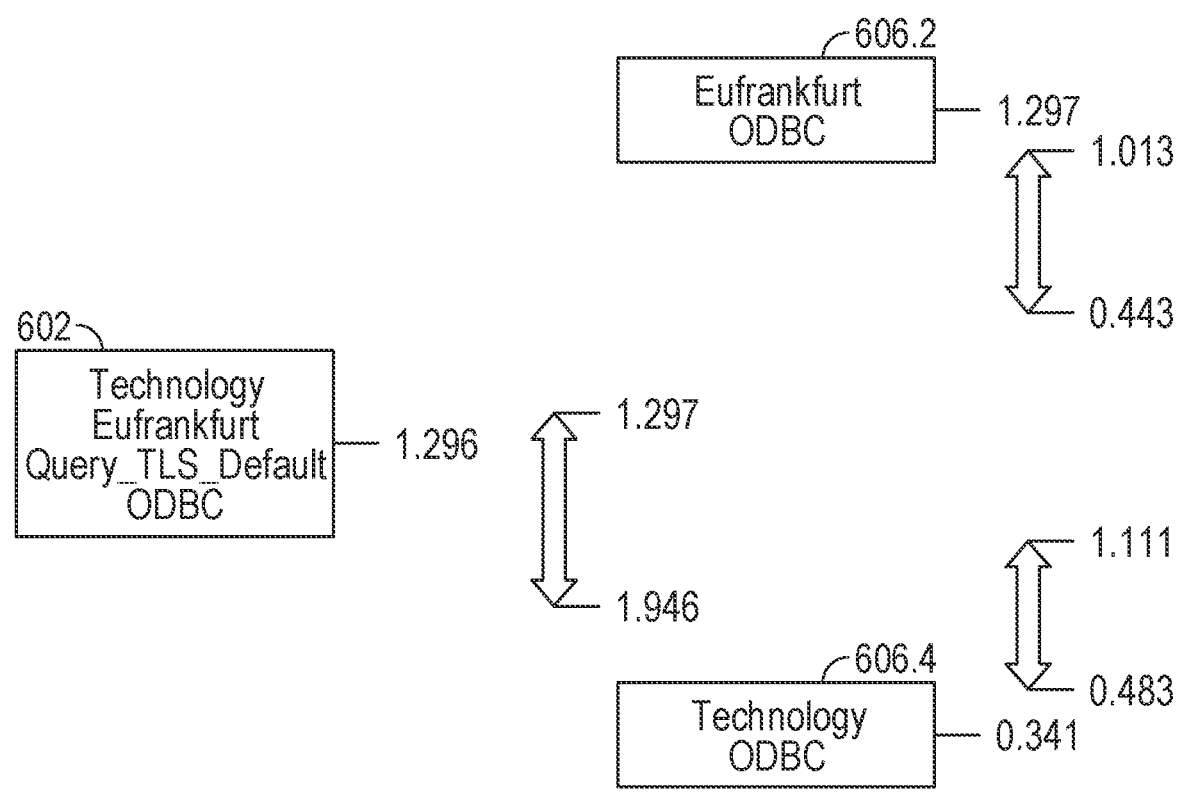
FIG. 8 shows examples of data segments and the range of KPI growth of its parent segments, according to some example embodiments.

A data segment may be identified as significant if its KPI growth/shrink is outside the range of KPI growth of its parents. FIG. 8 shows examples of data segments and the range of KPI growth of its parent segments. Here, data segment 602 may be identified as insignificant because its KPI growth of 1.296 falls within the range of KPI growth of its parents (0.946-1.297). In contrast, data segment 606.2 may be identified as significant because its KPI growth of 1.297 is higher than the range of KPI growth of its parents (0.483-1.013), i.e., positive contributor. Also, data segment 606.4 may be identified as significant because its KPI growth of 0.341 is below the range of KPI growth of its parents (0.483-1.111), i.e., negative contributor.

After pruning away the insignificant data segments, the remaining data segments may be ranked based on their contribution to the KPI shift. This may be performed by determining the excess growth of each significant data segment. The excess growth of the data segments may be performed in absolute terms.

Consider data segment 606.2 described above: its fastest growing parent has a KPI growth of 1.013. Thus, to be significant, its Bayesian KPI in treatment cohort divided Bayesian KPI in control cohort is greater than 1.013. Thus, it may be represented as follows: Bayesian KPI in treatment cohort>1.013×Bayesian KPI in control cohort.

The right-hand side of the formula (1.013×Bayesian KPI in control cohort) provides the threshold that the Bayesian KPI in the treatment cohort needs to exceed. The absolute amount by which it exceeds the threshold is the absolute excess.

Now, consider $T_s$=Bayesian KPI in treatment cohort for segment s; $C_s$=Bayesian KPI in control cohort for segment s. Then, the threshold $R^+_s$ for segment s to achieve a positive contribution is:

$$R^+_s = C_s \max_p(T_p/C_p)$$

, where the maximum is taken over all of the parent segments of s.

Likewise, the threshold $R^+_S$ to achieve a negative contribution is:

$$R^+_s = C_s \min_p(T_p/C_p)$$

, where the minimum is taken over all of the parent segments of s.

These thresholds determine the expected KPI range [$R^-$, $R^+$], which is the range of treatment KPI values that are within the range of the parent segments.

The absolute excess then measures how far the actual treatment KPI falls outside this range:

$$\text{KPI excess} = \max(0, T-R^+) + \min(0, T-R^-)$$

The significant data segments may then be ranked according to the absolute excess values. These identification of significant data segments and rankings may be provided in the output table, as described herein.

The auto-insight techniques described herein may be used to analyze various data shifts such as peaks, dips, step changes, gradual changes. For example, for a certain changes, the control cohort may be selected as a period just before or after the change (e.g., anomaly, step change, peak or dip). For gradual growth, the control cohort may be selected as a period before a longer time period, such as a quarter or a year before.

Moreover, the auto-insight techniques described herein may analyze the changes in distribution of data. Typically, change does not occur uniformly. Thus, root cause analysis may determine which data segments contributed more than others. A non-uniform change means that the distribution of KPI over data segments changed, not just the KPI value. Thus, the auto-insight techniques described herein may be used to detect hidden data shifts. For example, in a certain time interval, one cluster may provide a positive excess while another cluster may provide a negative excess, counteracting the positive excess. Thus, analysis of the total KPI may not detect any data shifts; however, analysis of the distribution of KPI may detect and identify these data shifts hidden in the stable KPI.

Figure 9:
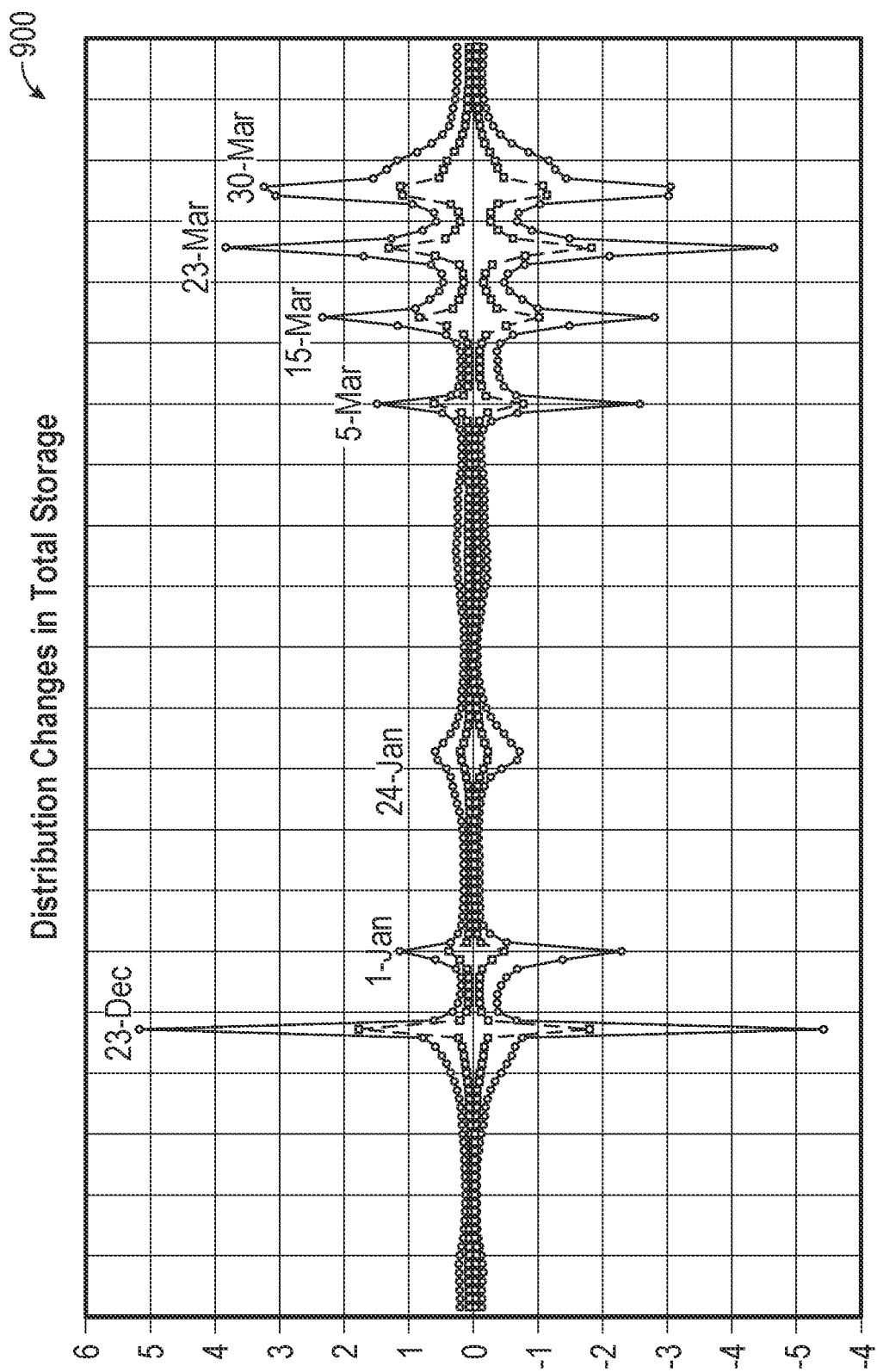
FIG. 9 shows a data seismograph, according to some example embodiments.

Changes in data distributions may be detected automatically by applying the auto-insight techniques to rolling pairs of time intervals. For example, a change on date "X" would produce large excess values when comparing the week before "X" to the week following X. FIG. 9 shows a data seismograph 900, according to some example embodiments. The seismograph 900 shows the distribution changes detected in total storage of a data warehouse. It detects underground or hidden shifts in data. In this example, some of these changes may be detectable in the KPI measuring total storage used (e.g., FIG. 4) such as the shifts on January 24. However, other shifts, such as the one on March 23 and December 23, were not noticeable on the KPI measuring total storage used.

Figure 10:
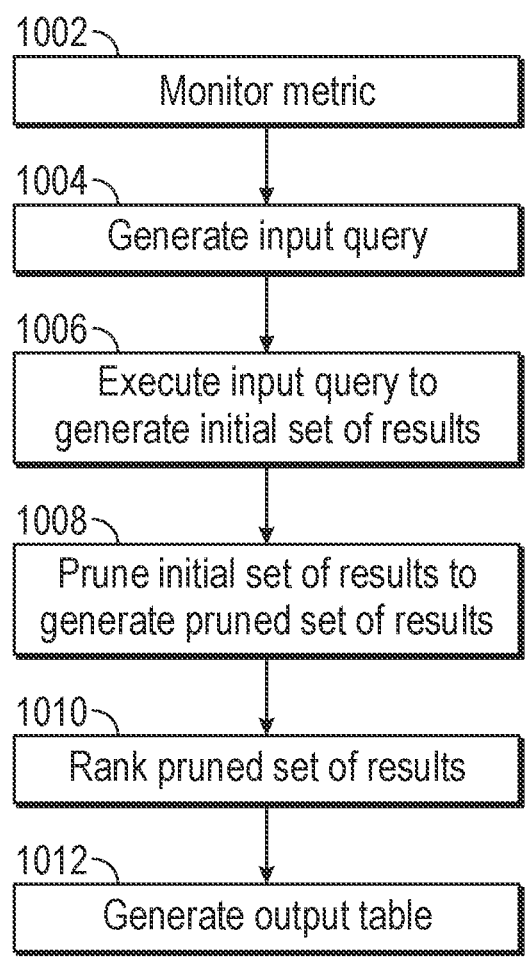
FIG. 10 shows a flow diagram for performing auto-sights, according to some example embodiments.

FIG. 10 illustrates a flow diagram for performing auto-sights, according to some example embodiments. At 1002, a metric representative of a KPI may be monitored. A shift in that metric may be detected, either automatically or manually by a user.

At 1004, an input query may be generated. The input query may include dimensions, treatment and control cohorts, and the KPI of interest, as described herein.

At 1006, the input query may be executed to generate an initial set of results, as described herein. At 1008, the initial set of results may be pruned to generate a pruned set of results, as described herein. At 1010, the pruned set of results may be ranked based on a contribution value of each data segment to the data shift, as described herein. At 1012, an output table based on the ranking may be generated, as described herein.

Figure 11:
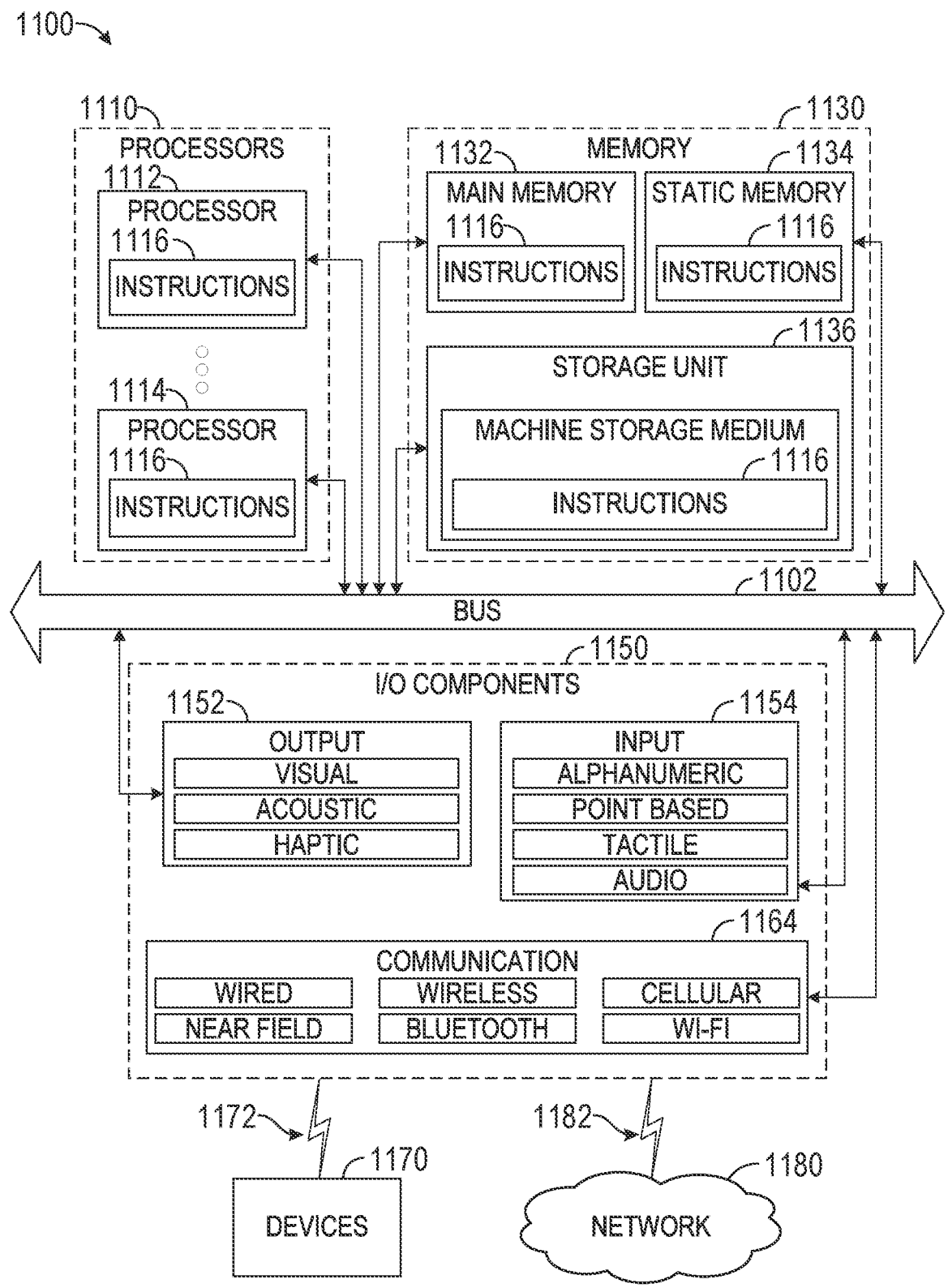
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the methods described herein. As another example, the instructions 1116 may cause the machine 1100 to implement portions of the data flows described herein. In this way, the instructions 1116 transform a general, non-programmed machine into a particular machine 1100 (e.g., the remote computing device 106, the access management system 118, the compute service manager 112, the execution platform 114, the access management system 118, the Web proxy 120, remote computing device 106) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 1 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the remote computing device 106, the access management system 110, the compute service manager 112, the execution platform 114, the access management system 118, the Web proxy 120, and the devices 1170 may include any other of these systems and devices.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: monitoring a metric representative of a key performance indicator; generating an input query to identify root causes in a data shift in the metric; executing, by a processor, the input query to generate an initial set of results; pruning the initial set of results to generate a pruned set of results; ranking the pruned set of results based on a contribution value of each data segment to the data shift; and generating an output table based on the ranking.

Example 2. The method of example 2 wherein the input query includes a set of dimensions representative of features related to the metric.

Example 3. The method of any of examples 1-2, wherein the input query includes identification of a treatment cohort containing the data shift and a separate control cohort.

Example 4. The method of any of examples 1-3, wherein the treatment and control cohorts are non-temporal groups.

Example 5. The method of any of examples 1-4, wherein pruning comprises: for each data segment, determining the growth of the metric by the data segment, wherein the data segment includes a plurality of dimensions; generating parent segments for that data segment, where each parent segment removes a different dimension; determining a range of growth of the metric by the parent segments; comparing the growth of the metric by the data segment and the range of growth of the metric by the parent segments; and based on the growth of the metric by the data segment falling outside the range of growth of the metric by the parent segments, including the respective data segment in the pruned set of results.

Example 6. The method of any of examples 1-5, wherein the pruning is performed at different hierarchical depths of the data segments.

Example 7. The method of any of examples 1-6, determining an absolute excess value for each data segment in the pruned set of results, wherein the ranking is based on the absolute excess value.

Example 8. The method of any of examples 1-7, wherein the data shift corresponds to a distribution shift in the metric.

Example 9. A system comprising: one or more processors of a machine; and a memory storing instructions that, when executed by the one or more processors, cause the machine to perform operations implementing any one of example methods 1 to 8.

Example 10. A machine-readable storage device embodying instructions that, when executed by a machine, cause the machine to perform operations implementing any one of example methods 1 to 8.

What is claimed is:

1. A method comprising:
   detecting a change in metric representative of a key performance indicator in a network-based data system;
   executing, by a processor, an input query to identify a root cause for the detected change generating an initial set of results including a plurality of data segments based on the detected change;
   pruning the initial set of results to generate a pruned set of results, the pruning including for each data segment of the plurality of data segments:
   generating one or more parent segments for the respective data segment, wherein the data segment includes a plurality of dimensions and each parent segment removes a different dimension of the plurality of dimensions,
   calculating a range of growth for the respective data segment and a range of growth by each of the parent segments,
   comparing the growth of the respective data segment and the range of growth by each of the parent segments, and
   selecting the respective data segment based on the comparison;
   generating an output table based on the pruned set of results.

2. The method of claim 1, further comprising:
   ranking the pruned set of results based on a contribution value of each data segment to the data shift, wherein the output table is based on the ranking.

3. The method of claim 1, wherein the input query includes a set of dimensions representative of features related to the metric.

4. The method of claim 1, wherein the input query includes identification of a treatment cohort containing the data shift and a separate control cohort.

5. The method of claim 4, wherein the treatment and control cohorts are non-temporal groups.

6. The method of claim 1,
wherein the pruning is performed at different hierarchical depths of the data segments.

7. The method of claim 1, further comprising:
determining an absolute excess value for each data segment in the pruned set of results, wherein the ranking is based on the absolute excess value.

8. The method of claim 1, wherein the data shift corresponds to a distribution shift in the metric.

9. A machine-storage medium embodying instructions that, when executed by a machine, cause the machine to perform operations comprising:
detecting a change in metric representative of a key performance indicator in a network-based data system;
executing an input query to identify a root cause for the detected change generating an initial set of results including a plurality of data segments based on the detected change;
pruning the initial set of results to generate a pruned set of results, the pruning including for each data segment of the plurality of data segments:
generating one or more parent segments for the respective data segment, wherein the data segment includes a plurality of dimensions and each parent segment removes a different dimension of the plurality of dimensions,
calculating a range of growth for the respective data segment and a range of growth by each of the parent segments,
comparing the growth of the respective data segment and the range of growth by each of the parent segments, and
selecting the respective data segment based on the comparison;
generating an output table based on the pruned set of results.

10. The machine-storage medium of claim 9, further comprising:
ranking the pruned set of results based on a contribution value of each data segment to the data shift, wherein the output table is based on the ranking.

11. The machine-storage medium of claim 9, wherein the input query includes a set of dimensions representative of features related to the metric.

12. The machine-storage medium of claim 9, wherein the input query includes identification of a treatment cohort containing the data shift and a separate control cohort.

13. The machine-storage medium of claim 12, wherein the treatment and control cohorts are non-temporal groups.

14. The machine-storage medium of claim 9,
wherein the pruning is performed at different hierarchical depths of the data segments.

15. The machine-storage medium of claim 9, further comprising:
determining an absolute excess value for each data segment in the pruned set of results, wherein the ranking is based on the absolute excess value.

16. The machine-storage medium of claim 9, wherein the data shift corresponds to a distribution shift in the metric.

17. A system comprising:
at least one hardware processor; and
at least one memory storing instructions that, when executed by the at least one hardware processor, cause the at least one hardware processor to perform operations comprising:
detecting a change in metric representative of a key performance indicator in a network-based data system;
executing an input query to identify a root cause for the detected change generating an initial set of results including a plurality of data segments based on the detected change;
pruning the initial set of results to generate a pruned set of results, the pruning including for each data segment of the plurality of data segments:
generating one or more parent segments for the respective data segment, wherein the data segment includes a plurality of dimensions and each parent segment removes a different dimension of the plurality of dimensions,
calculating a range of growth for the respective data segment and a range of growth by each of the parent segments,
comparing the growth of the respective data segment and the range of growth by each of the parent segments, and
selecting the respective data segment based on the comparison;
generating an output table based on the pruned set of results.

18. The system of claim 17, the operations further comprising:
ranking the pruned set of results based on a contribution value of each data segment to the data shift, wherein the output table is based on the ranking.

19. The system of claim 17, wherein the input query includes a set of dimensions representative of features related to the metric.

20. The system of claim 17, wherein the input query includes identification of a treatment cohort containing the data shift and a separate control cohort.

21. The system of claim 20, wherein the treatment and control cohorts are non-temporal groups.

22. The system of claim 17,
wherein the pruning is performed at different hierarchical depths of the data segments.

23. The system of claim 17, the operations further comprising:
determining an absolute excess value for each data segment in the pruned set of results, wherein the ranking is based on the absolute excess value.

24. The system of claim 17, wherein the data shift corresponds to a distribution shift in the metric.

* * * * *